United States Patent
Höglund et al.

(10) Patent No.: US 11,239,955 B2
(45) Date of Patent: Feb. 1, 2022

(54) SUPPORTING MULTIPLE HYBRID AUTOMATIC REPEAT REQUEST PROCESSES

(71) Applicant: Telefonaktiebolaget LM Ericsson (publ), Stockholm (SE)

(72) Inventors: Andreas Höglund, Solna (SE); Olof Liberg, Stockholm (SE); Yuhang Liu, Lund (SE); Oscar Ohlsson, Stockholm (SE); Béla Rathonyi, Lomma (SE); Mikael Wittberg, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 168 days.

(21) Appl. No.: 16/479,695

(22) PCT Filed: Jan. 29, 2018

(86) PCT No.: PCT/EP2018/052103
§ 371 (c)(1),
(2) Date: Jul. 22, 2019

(87) PCT Pub. No.: WO2018/138321
PCT Pub. Date: Aug. 2, 2018

(65) Prior Publication Data
US 2021/0184802 A1    Jun. 17, 2021

Related U.S. Application Data

(60) Provisional application No. 62/451,544, filed on Jan. 27, 2017.

(51) Int. Cl.
*H04W 4/00* (2018.01)
*H04L 1/18* (2006.01)
*H04L 5/00* (2006.01)

(52) U.S. Cl.
CPC .......... *H04L 1/1822* (2013.01); *H04L 5/0055* (2013.01)

(58) Field of Classification Search
CPC .... H04L 1/1822; H04L 5/0055; H04L 1/1864
USPC ......................................................... 370/329
See application file for complete search history.

(56) References Cited

U.S. PATENT DOCUMENTS 9,425,925 B2    8/2016 Lee et al.
2017/0373803 A1*  12/2017 Wu ...................... H04L 1/1887
2019/0261255 A1*  8/2019 You ...................... H04W 16/14

OTHER PUBLICATIONS

Ericsson, "On the impact of supporting 2 HARQ processes on connected mode DRX in NB-IoT", 3GPP TSG-RAN WG2#96, Reno, Nevada, US, Nov. 14, 2016, pp. 1-5, Tdoc R2-167628, 3GPP.

(Continued)

*Primary Examiner* — Mang Hang Yeung
(74) *Attorney, Agent, or Firm* — Christopher & Weisberg, P.A.

(57) ABSTRACT

A radio device (110) and/or network node (105) support multiple HARQ processes. In particular, responsive to the radio device (110) receiving a resource grant for a first HARQ process, the radio device (110) starts or restarts a timer that configures the radio device (110) to monitor for a resource grant of a second HARQ process. Additionally or alternatively, the network node (105) transmits a resource grant for a first HARQ process and a resource grant for a second HARQ process to the same radio device (110).

16 Claims, 9 Drawing Sheets

(56) References Cited

OTHER PUBLICATIONS

Huawei et al., "Support of 2 HARQ processes and Larger TBS in NB-IoT", 3GPP TSG-RAN WG2 Meeting #96, Reno, Nevada, US, Nov. 14, 2016, pp. 1-6, R2-167821, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.6.0, Dec. 1, 2016, pp. 1-314, 3GPP, France.

* cited by examiner

SUPPORTING MULTIPLE HYBRID AUTOMATIC REPEAT REQUEST PROCESSES

This application claims the benefit of U.S. Provisional Application No. 62/451,544, filed 27 Jan. 2018, the disclosure of all of which is incorporated by reference herein in its entirety.

TECHNICAL FIELD

Embodiments of the present disclosure generally relate to the field of wireless communication, and more particularly relate to supporting Hybrid Automatic Repeat Request (HARQ) processes in a wireless communication system.

BACKGROUND

Narrowband Internet-of-Things (NB-IoT) is a narrowband system being developed for cellular Internet of Things (IoT) by the 3rd Generation Partnership Project (3GPP). The NB-IoT system, which is based on existing Long Term Evolution (LTE) systems and addresses optimized network architecture and improved indoor coverage for massive number of devices, is designed to support devices having, for example, low throughput (e.g. 2 kbps), low delay sensitivity (~10 seconds), ultra-low device cost (below 5 dollars), and/or low device power consumption (battery life of 10 years).

It is envisioned that each cell (~1 km2) in this system may serve thousands of devices (e.g., ~50 thousand devices) such as sensors, meters, actuators, and alike. In order to be able to make use of existing spectrum for, e.g., Global System for Mobile communication (GSM), a fairly narrow bandwidth has been adopted for NB-IoT technology.

Mobile communication is subject to error due to propagation loss, noise, interference, and channel fading. LTE provides Hybrid Automatic Repeat Request (HARQ) functionality to ensure reliable data delivery between peer entities (called HARQ entities). HARQ is a combination of Forward Error Correction (FEC) coding and Automatic Repeat Request (ARQ) error control techniques. HARQ technique uses FEC coding to detect and possibly correct errors that occurs in wireless data transmission and ARQ mechanism to retransmit unrecoverable erroneous data packets. To achieve continuous data transmission between HARQ entities, an LTE User Equipment (UE) may be configured with a number of parallel HARQ processes in both downlink (DL) and uplink (UL).

In 3GPP Rel-13, due to the design objectives as mentioned previously, a NB-IoT UE supports only one downlink HARQ process and only one uplink HARQ process, which reduces the device complexity (which reduces cost) and power consumption for the UE and increases data transfer latency and limits the maximum data throughput. This design is reflected in, e.g., 3GPP TS36.300 v13.6.0. One of the objectives of the Rel-14 NB-IoT enhancements to previous NB-IoT systems being considered in 3GPP is to reduce power consumption and latency.

In an LTE system, an evolved NodeB (eNB) can configure a UE in connected mode with Discontinuous Reception (DRX) to enable discontinuous reception, to save radio resource as well as to reduce UE power consumption. In connected mode, if DRX is configured by the network, the UE should monitor the NPDCCH discontinuously per some predefined pattern. As connected mode DRX in NB-IoT was originally designed for a single HARQ process in each of the uplink and downlink, a UE will stop monitoring the Narrowband Physical Downlink Control Channel (NPDCCH) after a downlink assignment/uplink grant is received and not continue monitoring until the HARQ Round Trip Time (RTT) Timer/HARQ UL RTT Timer for the corresponding HARQ process has expired. The Rel-13 DRX procedure is illustrated in FIG. 1.

In particular, FIG. 1 illustrates two example timelines 10, 20 in accordance with Rel-13 NB-IoT DRX procedures, which use a single HARQ process in the downlink and a single HARQ process in the uplink. According to the downlink case illustrated by example timeline 10 in FIG. 1, the UE will not continue to monitor NPDCCH after the first downlink assignment until the HARQ RTT Timer expires, i.e. after it has received the corresponding Narrowband Physical Downlink Shared Channel (NPDSCH) transmission and has sent the corresponding HARQ Acknowledgement/Negative Acknowledgement (ACK/NACK) feedback. Specifically, for the downlink, the UE is configured to detect, at DL time 12, a downlink grant on the NPDCCH indicating new transmission, and in response, stop the onDurationTimer, and stop monitoring the NPDCCH. At DL time 14, the UE receives NPDSCH and starts the HARQ RTT Timer. At DL time 16, responsive to expiration of the HARQ RTT Timer, the UE starts or restarts the drx-InactivityTimer and drx-RetransmissionTimer (in case NPDSCH data decoding fails). The UE also starts monitoring the NPDCCH. At DL time 18, the UE detects a downlink grant on the NPDCCH and stops the drx-InactivityTinner and drx-RetransmissionTimer (if running).

With respect to the uplink case, the UE does not continue to monitor the NPDCCH after the first uplink data grant until UL HARQ RTT timer expires, i.e., after it has transmitted the Narrowband Physical Uplink Shared Channel and the network is ready to schedule another uplink transmission/retransmission. Thus, for the uplink and as illustrated in the example timeline 20 of FIG. 1, the UE detects, at UL time 22, an uplink grant on the NPDCCH indicating a new transmission, stops the onDurationTimer, and stops monitoring the NPDCCH. At UL time 24, the UE transmits data on Narrowband Physical Uplink Shared Channel (NPUSCH) and starts the UL HARQ RTT Timer. At UL time 26, the UL HARQ RTT Timer expires and the UE starts or restarts the drx-InactivityTinner and drx-ULRetransmissionTimer. The UE also starts monitoring the NPDCCH. At UL time 28, the UE detects an uplink grant on NPDCCH, stops the drx-InactivityTinner and stops the drx-ULRetransmissionTimer.

In view of the UE behavior described above, the eNB is typically required to wait for a first HARQ process to complete before a second HARQ process can be scheduled. Otherwise, the UE may not detect the NPDCCH for the second HARQ process (i.e., because the UE stops monitoring the NPDCCH in its search space after detecting the NPDCCH for the first HARQ process). Accordingly, the UE described above does not support two HARQ processes on the downlink nor on the uplink.

SUMMARY

Embodiments of the present disclosure include methods, systems, and apparatus, computer readable mediums, and programs for supporting multiple HARQ processes. Particular embodiments disclosed herein include exactly two HARQ processes, both in the downlink and uplink, according to a particular eNB scheduling strategy and/or UE behavior in connected mode DRX as described according to various embodiments below. Additionally or alternatively, the eNB and/or UE may switch between a single HARQ process operating mode and a multiple HARQ process operating mode.

Particular embodiments of the present disclosure include a method performed by a radio device for supporting multiple HARQ processes. The method comprises, responsive to the radio device receiving a resource grant for a first HARQ process, starting or restarting a timer that configures the radio device to monitor for a resource grant of a second HARQ process.

In some embodiments, the method further comprises receiving the resource grant for the second HARQ process while the timer is running, and stopping the timer in response to said receiving of the resource grant for the second HARQ process. In at least one such embodiment, receiving the resource grants for the first and second HARQ processes comprises receiving the resource grants for the first and second HARQ processes over a Narrowband Physical Downlink Control Channel.

In some embodiments, receiving the resource grants for the first and second HARQ processes comprises receiving the resource grants for the first and second HARQ processes within a resource grant search space monitored by the radio device.

In some embodiments, the method further comprises configuring the radio device to expect the resource grants for the first and second HARQ processes based on a received configuration message. In at least one such embodiment, configuring the radio device to expect the resource grants for the first and second HARQ processes comprises switching the radio device from a single HARQ operation mode to a multiple HARQ operation mode.

In some embodiments, starting or restarting of the timer is further responsive to determining that receiving the resource grant of the second HARQ process is possible according to one or more criteria. In at least one such embodiment, determining that receiving the resource grant of the second HARQ process is possible according to one or more criteria comprises determining that no pending transmission is scheduled for the second HARQ process and determining that a HARQ round trip time (RTT) timer for the second HARQ process not running. Additionally or alternatively, in some embodiments, determining that receiving the resource grant of the second HARQ process is possible comprises determining that the resource grant of the first HARQ process was received in order with respect to the second HARQ process. In at least one such embodiment, determining that the resource grant of the first HARQ process was received in order with respect to the second HARQ process is based on a HARQ process identifier of the first HARQ process.

In some embodiments, the method further comprises refraining from monitoring a control channel on which the resource grants are transmitted responsive to the timer not running.

In some embodiments, the first and second HARQ processes are both downlink HARQ processes.

In some embodiments, the first and second HARQ processes are both uplink HARQ processes.

In some embodiments, the radio device is a Narrowband Internet-of-Things user equipment (NB-IoT UE).

In some embodiments, the timer is a drx-InactivityTimer.

In some embodiments, the resource grant for the first HARQ process and a corresponding data transmission scheduled according to the resource grant for the first HARQ process are carried by a 1 ms control subframe and a 1 ms data subframe, respectively.

Other embodiments of the present disclosure include a radio device for supporting multiple Hybrid Automatic Repeat Request (HARQ) processes. The radio device is configured to, responsive to the radio device receiving a resource grant for a first HARQ process, start or restart a timer that configures the radio device to monitor for a resource grant of a second HARQ process.

In some embodiments, the radio device is configured to perform any of the methods described above.

In some embodiments, the radio device comprises a processor and a memory, the memory containing instructions executable by the processor whereby the radio device is configured to operate in accordance with any of the above.

In some embodiments, the radio device comprises a receiving module configured to receive the resource grant for the first HARQ process, and a timing module configured to start or restart the timer responsive to the receiving module receiving the resource grant for the first HARQ process. The timer configuring the radio device to monitor for a resource grant of a second HARQ process.

Other embodiments of the present disclosure include a computer program, comprising instructions which, when executed on at least one processor of a radio device, cause the at least one processor to carry out any of the methods above.

Other embodiments of the present disclosure include a method performed by a network node for supporting multiple HARQ processes. The method comprises transmitting a resource grant for a first HARQ process and a resource grant for a second HARQ process to the same radio device.

In some embodiments, transmitting the resource grant for the first HARQ process and the resource grant for the second HARQ process to the same radio device comprises transmitting the resource grant for the first HARQ process and the resource grant for the second HARQ process on a Narrowband Physical Downlink Control Channel.

In some embodiments, transmitting the resource grant for the first HARQ process and the resource grant for the second HARQ process to the same radio device comprises transmitting the resource grant for the first HARQ process and the resource grant for the second HARQ process within a search space monitored by the radio device for resource grants.

In some embodiments, the resource grant for the first HARQ process and a corresponding data transmission scheduled according to the resource grant for the first HARQ process are carried by a 1 ms control subframe and a 1 ms data subframe, respectively.

In some embodiments, the first and second HARQ processes are both downlink HARQ processes.

In some embodiments, the first and second HARQ processes are both uplink HARQ processes.

In some embodiments, the radio device is a Narrowband Internet-of-Things user equipment (NB-IoT UE).

Other embodiments of the present disclosure include a network node for supporting multiple Hybrid Automatic Repeat Request (HARQ) processes. The network node is configured to transmit a resource grant for a first HARQ process and a resource grant for a second HARQ process to the same radio device.

In some embodiments, the network node is configured to perform any of the methods performed by a network node described above.

In some embodiments, the network node comprises a processor and a memory, the memory containing instructions executable by the processor whereby the network node is configured to operate according to any of the methods performed by a network node described above.

In some embodiments, the network node comprises a first transmitting module configured to transmit the resource grant for a first HARQ process to the radio device, and a second transmitting module configured to transmit the resource grant for the second HARQ process to the radio device.

Other embodiments of the present disclosure include a computer program, comprising instructions which, when executed on at least one processor of a network node, cause the at least one processor to carry out any of the methods performed by a network node described above.

Other embodiments of the present disclosure include a carrier containing any of the computer programs described above. Such a carrier is one of an electronic signal, optical signal, radio signal, or computer readable storage medium.

DETAILED DESCRIPTION

Embodiments of the present disclosure include methods, systems, and apparatus, computer readable mediums, and programs for supporting multiple HARQ processes. Particular embodiments disclosed herein include exactly two HARQ processes, both in the downlink and uplink, according to a particular eNB scheduling strategy and/or UE behavior in connected mode DRX as described according to various embodiments below. Additionally or alternatively, the eNB and/or UE may switch between a single HARQ process operating mode and a multiple HARQ process operating mode.

Figure 1:
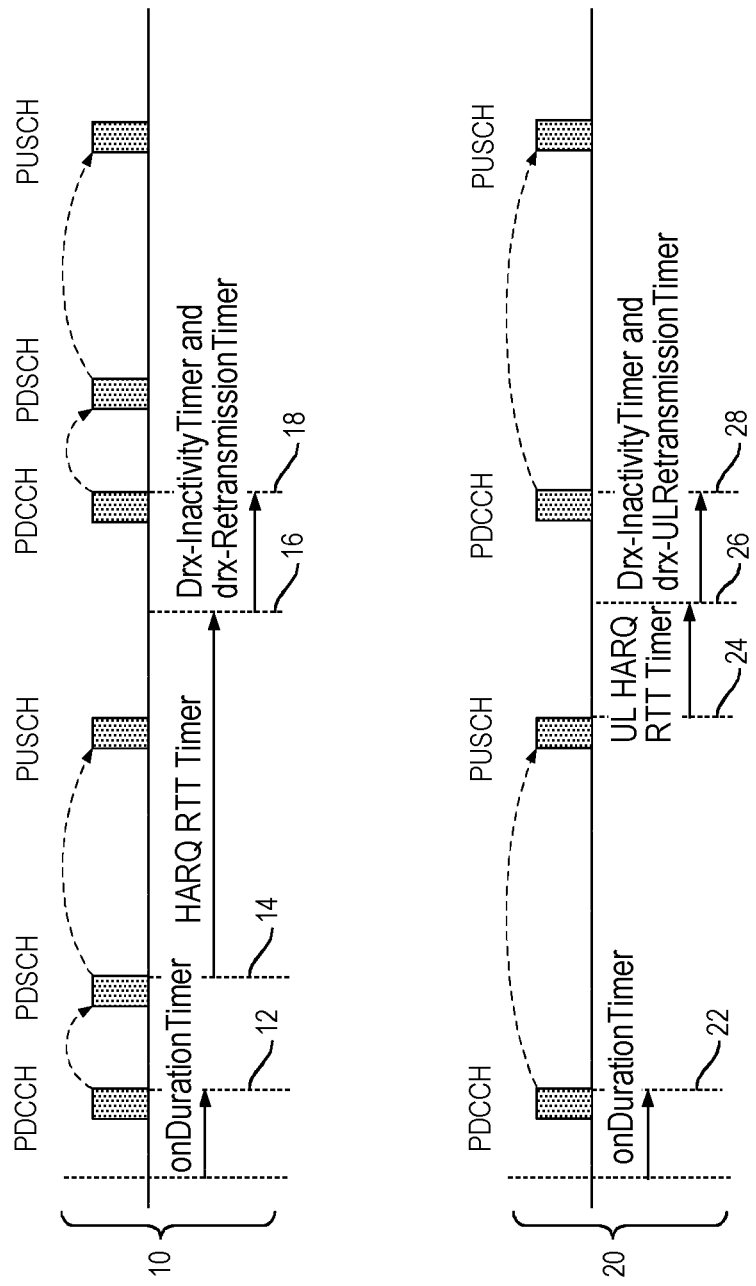
FIG. 1 is a block diagram illustrating an uplink and a downlink according to the prior art.
Figure 2:
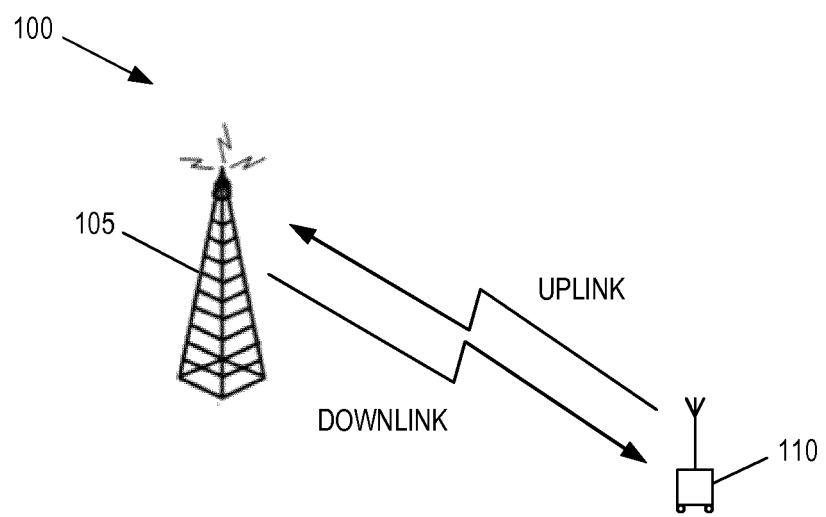
FIG. 2 is a block diagram illustrating an example communication system, according to one or more embodiments.

FIG. 2 illustrates an example communication system 100 according to one or more embodiments of the present disclosure. The communication system 100 comprises a radio device 110 and network node 105 that wirelessly communicate with each other using an uplink and a downlink. According to embodiments the network node 105 may be an access node (e.g., an eNodeB (eNB)) and/or the radio device 110 may be a UE (e.g., an NB-IoT UE).

The network node 105 provides uplink and downlink grants to the user equipment. An uplink grant provides the user equipment with scheduling information to use when transmitting on the uplink, and the user equipment transmits on the uplink in accordance with the uplink grant. A downlink grant provides the user equipment with scheduling information that describes when a data transmission from the network node 105 may be expected. An uplink or downlink grant may also be referred to as an uplink or downlink assignment, respectively.

Figure 3:
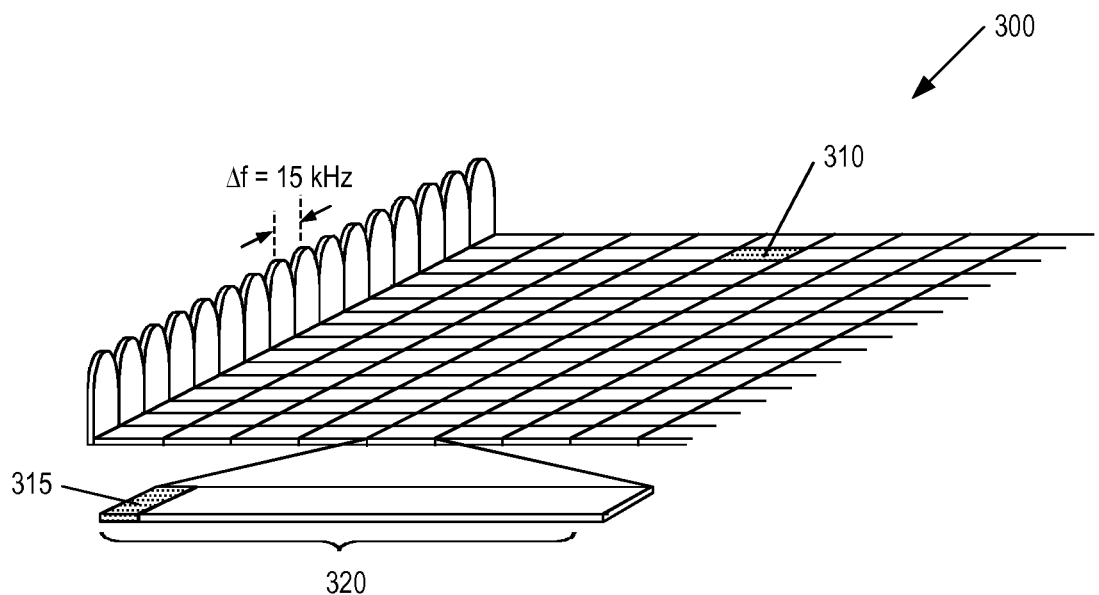
FIG. 3 is a block diagram illustrating an example Orthogonal Frequency-Division Multiplexing (OFDM) time-frequency grid, according to one or more embodiments.

Radio communication between the network node 105 and the user equipment may be performed using radio resources across a time and frequency domain. For example, NB-IoT uses Orthogonal Frequency-Division Multiplexing (OFDM) in the downlink and Discrete Fourier Transform (DFT) spread OFDM in the uplink. The basic LTE downlink physical resource can be viewed as a time-frequency grid. FIG. 3 illustrates a portion of an example OFDM time-frequency grid for LTE. Generally speaking, the time-frequency grid is divided into one millisecond subframes. Each subframe includes a number of OFDM symbols. For a normal cyclic prefix (CP) 315 length, suitable for use in situations where multipath dispersion is not expected to be extremely severe, a subframe may comprise fourteen OFDM symbols. A subframe may comprise twelve OFDM symbols if an extended CP 315 is used. In the frequency domain, the physical resources shown in FIG. 3 are divided into adjacent subcarriers with a spacing of 15 kHz. The number of subcarriers may vary according to the allocated system bandwidth. The smallest element of the time-frequency grid is typically referred to as a resource element 310, which comprises one OFDM subcarrier during one OFDM symbol 320 interval. NB-IoT uses a similar time-frequency grid for the downlink (typically including twelve 15 kHz adjacent subcarriers for a total of 180 kHz).

Figure 4:
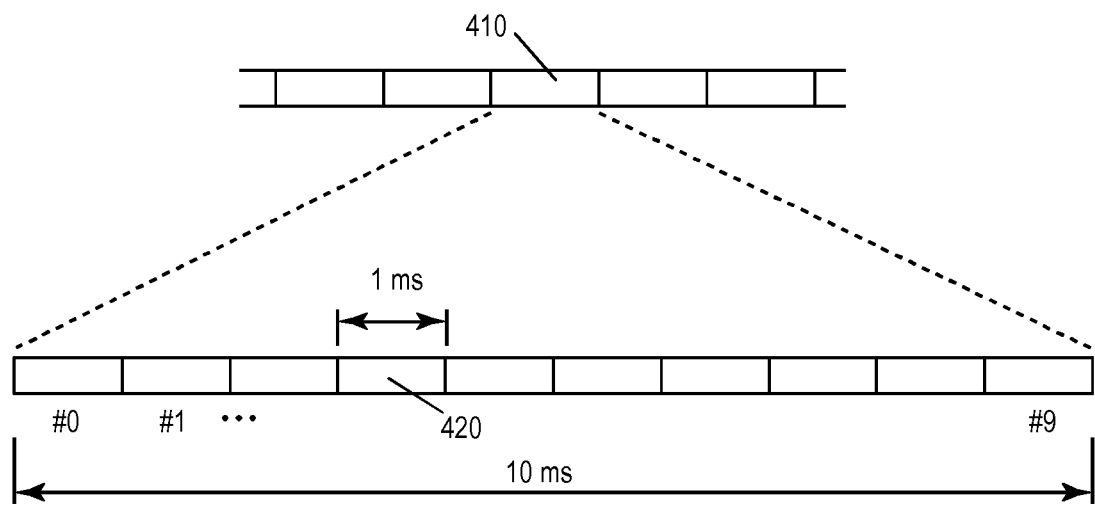
FIG. 4 is a block diagram illustrating an example radio frame, according to one or more embodiments.

In NB-IoT (and LTE) systems, data is transmitted from a network node 105 to a user equipment over the downlink. The downlink is time and frequency multiplexed and shared among user equipment served by the network node 105. As shown in FIG. 4, the downlink is typically organized into ten millisecond radio frames 410. Each radio frame 410 typically comprises ten equally-sized subframes. Each subframe 420 typically comprises two equally-sized slots (not shown).

Figure 5:
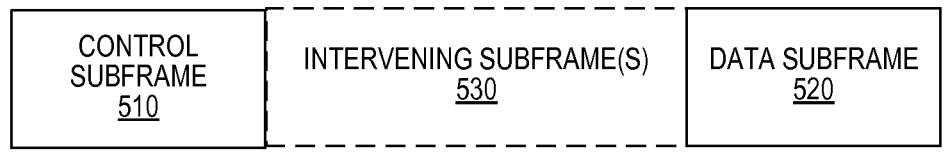
FIG. 5 is a block diagram illustrating example subframes, according to one or more embodiments.

As shown in the example of FIG. 5, transmissions on the downlink may occur in a control subframe 510 and/or a data subframe 520, which may be separated from each other by one or more intervening subframes 530. The control subframe 510 may provide one or more uplink grants and/or one or more downlink grants. A downlink grant included in a control subframe 510 may provide scheduling information with respect to resources in the data subframe 520. The data subframe 520 occurs after the control subframe 510. The data subframe 520 may also occur after one or more intervening subframes. In some embodiments, data transmitted in the data subframe 520 is transmitted specifically for a particular user equipment. In other embodiments, data transmitted in the data subframe 520 is transmitted for a plurality of user equipments.

In some embodiments, the control subframe 510 may be a Physical Downlink Control Channel (PDCCH) or Narrowband PDCCH (NPDCCH), whereas the data subframe 520 may be a Physical Downlink Shared Channel (PDSCH) or Narrowband PDSCH (NPDSCH). The control subframe 510 may carry control information. In some such embodiments, the control information may be downlink control information (DCI). Such DCI may be transmitted, e.g., in the first two, three, or four OFDM symbols 320 of the control subframe 510. According to embodiments, the control subframe 510 of a downlink may additionally or alternatively be used to schedule a data subframe of an uplink (not shown).

Indeed, the uplink in NB-IoT (and LTE) systems uses a similar time-frequency grid for the uplink, which used to transmit data from the user equipment to the network node 105. In particular, the uplink also typically includes twelve 15 kHz adjacent subcarriers for a total of 180 kHz is also typically organized into ten millisecond radio frames 410. Further, each radio frame 410 typically comprises ten equally-sized subframes 420, and each subframe 420 typically comprises two equally-sized slots (not shown). Although the downlink and uplink in NB-IoT (and LTE) are similarly structured, as previously mentioned, a different modulation technique is used for the downlink than is used for the uplink.

According to embodiments, the user equipment may provide HARQ feedback to the network node 105 in response to a downlink data transmission and/or the network node 105 may provide HARQ feedback to the user equipment in response to an uplink data transmission. Although particular embodiments proposed herein are directed to connected mode DRX for Rel-14 NB-IoT that supports exactly two HARQ processes in both downlink and uplink, other embodiments may similarly be used in other systems (e.g. Machine Type Communication (MTC), future 5G, or New Radio (NR) massive-MTC), which in some embodiments may be applied to balance system capacity, data rate, user device simplicity, and power consumption.

A first proposed embodiment bundles Downlink Control Information (DCI) and HARQ feedback, such that the eNB can transmit downlink or uplink grants for the two HARQ processes in a single NPDCCH occasion by different means, and the UE can transmit the HARQ feedback for both HARQ processes in a single NPUSCH (for the downlink data transfer case).

A second proposed embodiment includes separated Das and HARQ feedback, such that the eNB transmits downlink or uplink grants for the two HARQ processes independently. The UE may use start and stop conditions for the drx-InactivityTimer to ensure that such grants are not missed. These start and stop conditions may, for example, also configure the UE to stop monitoring the NPDCCH while there is potentially no further downlink assignment/uplink grant to be received.

One or more embodiments proposed herein may enable, e.g., a NB-IoT eNB and/or UE to support two HARQ processes both for downlink and uplink data transfer in connected mode DRX to achieve higher data rate and lower data transfer latency with marginal impact on device complexity and power consumption. Further, some embodiments may be used to introduce the use of two HARQ processes for NB-IoT in Rel-14.

To support two downlink and UL HARQ processes, the UE may need to receive more than one downlink or uplink grant during the active time in connected mode DRX. The UE behavior may depend on the way the two downlink and uplink grants are scheduled and transmitted to UE.

According to one example embodiment in which DCI and HARQ feedback are bundled, the eNB transmits downlink or uplink grants for the two HARQ processes in a single NPDCCH occasion, either by multiplexing the two control messages in the same NPDCCH occasion or using a single control message (DCI) to schedule one or two downlink or UL HARQ processes. For downlink data transfer, the UE may transmit a HARQ feedback for each HARQ process on the NPUSCH and to the eNB after decoding is finished. The HARQ feedbacks (i.e., for both HARQ processes) may also be bundled in a single NPUSCH transmission. To support multiple HARQ processes in which DCI and HARQ are bundled as described above, a UE may need to support new DCI and HARQ feedback formats.

Figure 6:
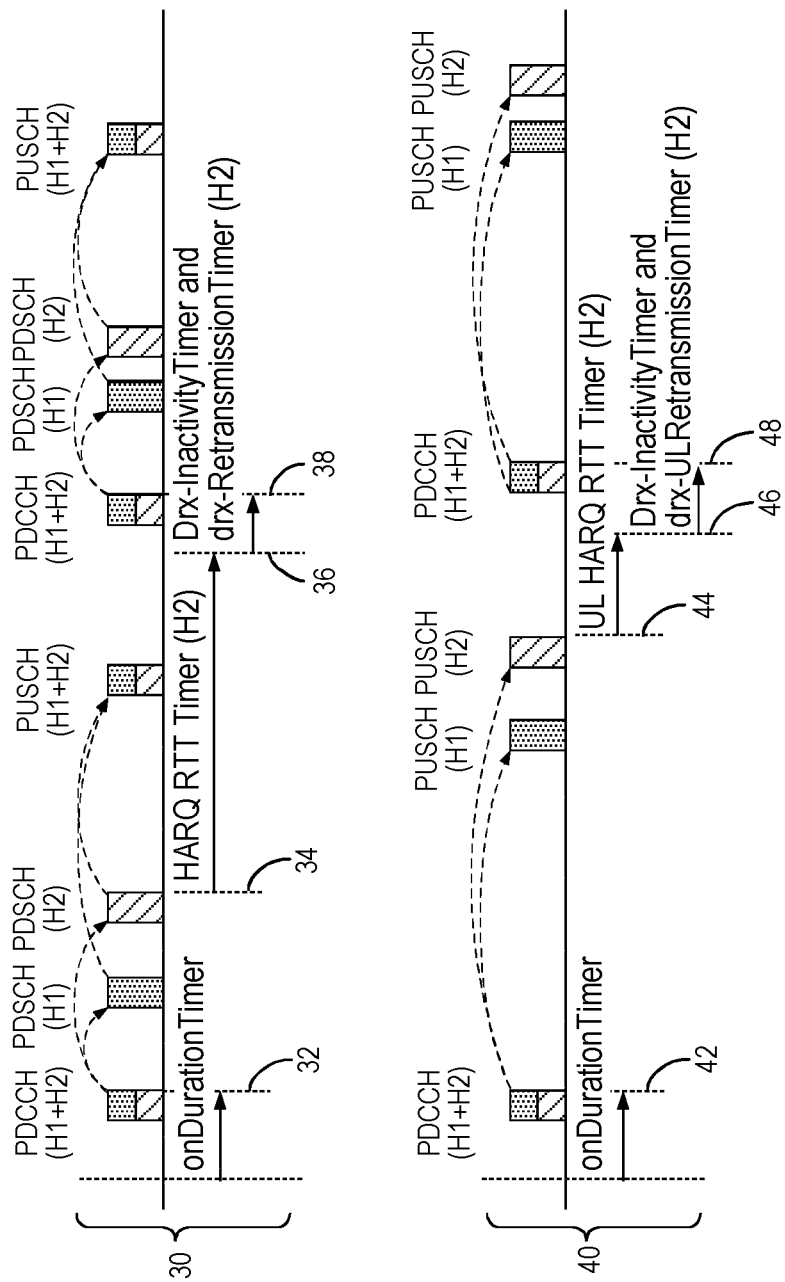
FIG. 6 is a block diagram illustrating an example of an uplink and downlink, according to one or more embodiments.

FIG. 6 illustrates an example of two timelines 30, 40 according to an NB-IoT DRX procedure that supports DCI and HARQ feedback bundling. The example includes 2 HARQ processes on the downlink (as illustrated by timeline 30) and 2 HARQ processes on the uplink (as illustrated by timeline 40). For downlink data transmission, as shown in FIG. 6, the UE detects, at DL time 32, two downlink grants (e.g., in a bundled DCI) on the NPDCCH indicating new transmissions, and stops the onDurationTimer. At DL time 34, responsive to having received two NPDSCHs, the UE starts two HARQ RTT Timers (i.e., at the end of the NPDSCHs). The two HARQ RTT Timers will expire at the same time (e.g., consistent with the Rel-13 definition), since the HARQ feedbacks corresponding to the received NPDSCHs will be bundled. At DL time 36, the HARQ RTT Timers expire, and in response, the UE starts or restarts a drx-InactivityTinner (and, in at least some embodiments, a drx-RetransmissionTimer in case any NPDSCH data decoding fails). At DL time 38, the UE detects two downlink grants on the NPDCCH, and stops the drx-InactivityTinner and/or the drx-RetransmissionTimers (if they are running).

For uplink data transmission, again with respect to FIG. 6, the UE detects, at UL time 42, two uplink grants on the NPDCCH indicating new transmissions, and stops the onDurationTimer. At UL time 44, responsive to having transmitted data on corresponding NPUSCHs, the UE starts an UL HARQ RTT Timer (i.e., at the end of the second NPUSCH). At UL time 46, responsive to expiration of the UL HARQ RTT Timer, the UE starts or restarts the drx-InactivityTinner and/or drx-ULRetransmissionTimer. At UL time 48, the UE detects two uplink grants on the NPDCCH, and stops the drx-InactivityTinner and/or drx-ULRetransmissionTimer.

Other embodiments include separate scheduling grants (e.g., via separate DCI) and separate corresponding HARQ feedback (e.g., for downlink data transfer) for two HARQ processes. Such embodiments may also be used to support NB-IoT connected mode DRX.

In particular, an eNB may schedule and transmit two downlink assignments and/or two uplink grants to a UE independently in the NPDCCH search space that the NB-IoT UE is configured to monitor. After the first grant is detected, the UE may continue to monitor the NPDCCH since the network might transmit another grant for the second HARQ process. To configure the UE to continue monitoring, the drx-InactivityTinner may be manipulated, as explained below.

When the UE detects a valid grant for a downlink or UL HARQ process, the NB-IoT UE may start (or restart) the drx-InactivityTinner so that may continue to monitor the NPDCCH for the potential grant for the second HARQ process. To save power the drx-InactivityTinner may be started only when needed, e.g., if the other HARQ process is not "busy." When the UE identifies that both HARQ processes have been busy or realizes that there will be no further downlink assignment/uplink grant to receive, the UE may stop monitoring NPDCCH immediately.

A HARQ process may be considered "busy," e.g., from the time the downlink assignment/uplink grant is received until the corresponding HARQ RTT Timer/UL HARQ RTT Timer expires and the UE is ready to receive another downlink assignment/uplink grant. The start condition for the drx-InactivityTinner may accommodate the occurrence of a busy HARQ process. For example, responsive to receiving grant for a given HARQ process, if the other HARQ process is currently available for scheduling (i.e., it has no scheduled or ongoing transmission and the corresponding HARQ RTT Timer is not running), then the UE may start (or restart) the drx-InactivityTinner.

Alternatively, the UE may control the drx-InactivityTinner based on which HARQ process is scheduled. For example, the eNB may schedule data using HARQ process 1 and 2. When the eNB schedules both HARQ processes, the eNB may start with the first HARQ process (HARQ process 1), followed by the second HARQ process (HARQ process 2). Correspondingly, the UE may start (or restart) the drx-InactivityTinner when HARQ process 1 is scheduled and stop the drx-InactivityTinner when HARQ process 2 is scheduled. Further, when eNB only schedules data on one of the two HARQ processes, the eNB may use HARQ process 2 so that the UE knows that HARQ process 1 will not be scheduled (i.e., there is no more downlink assignment/uplink grant to come in the NPDCCH). Other embodiments may use other HARQ process numbers (e.g., HARQ process 0 and HARQ process 1).

Figure 7:
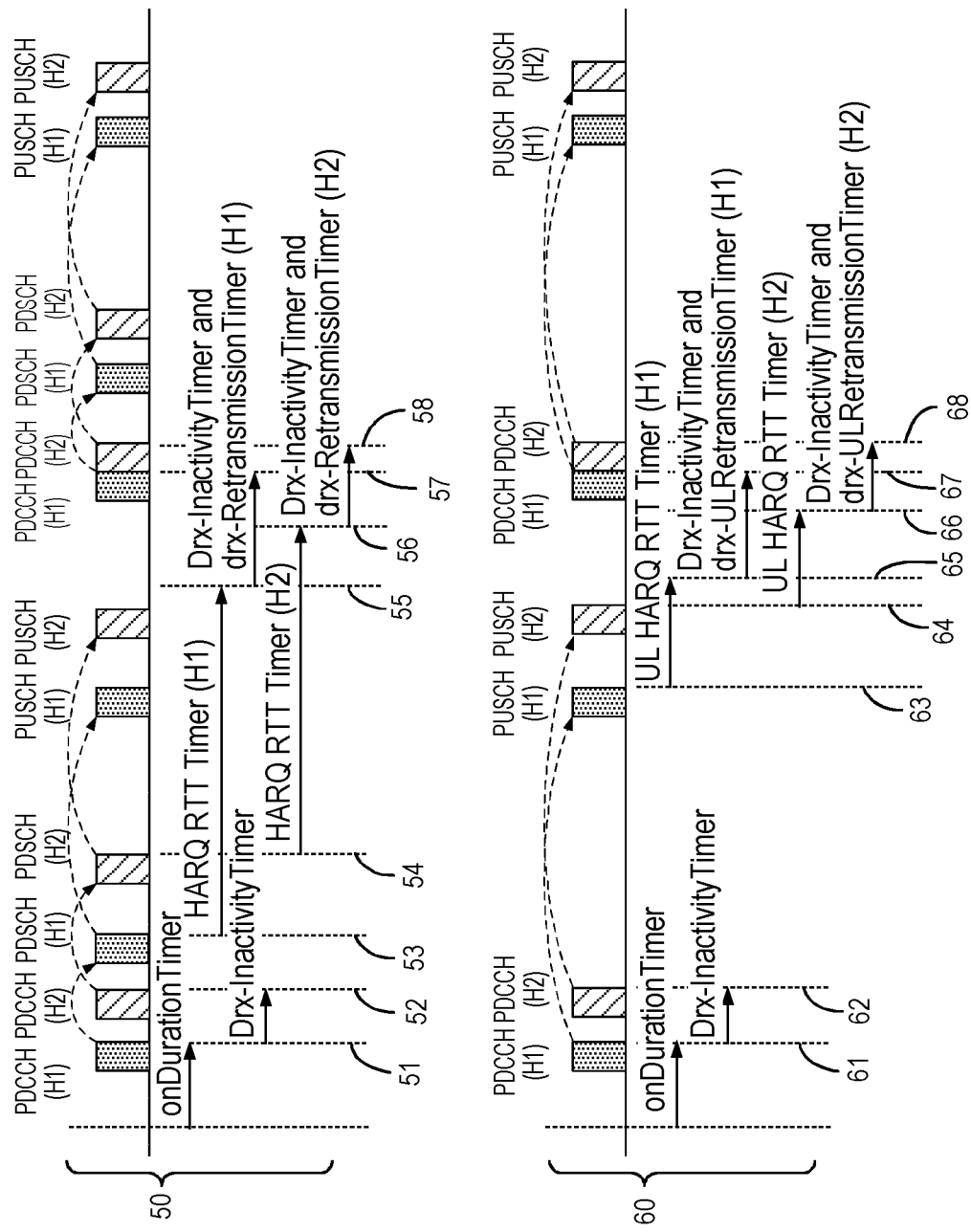
FIG. 7 is a block diagram illustrating another example of an uplink and downlink, according to one or more embodiments.

According to one or more of the above embodiments, the NB-IoT UE may avoid missing downlink assignments/uplink grants in connected mode DRX while not wasting power on monitoring NPDCCH when both HARQ processes are already "busy." An example embodiment in which two HARQ processes are scheduled with separated DCI and separated HARQ feedback is illustrated in FIG. 7. In FIG. 7, downlink timing is illustrated in the top timeline 50, and uplink timing is illustrated in the bottom timeline 60.

With respect to downlink data transmission in connected mode DRX with 2 HARQ processes, using separated Das and HARQ feedbacks, the UE is configured to, at DL time 51, detect a downlink grant for HARQ Process 1 (H1) on the NPDCCH indicating new transmission. In response, the UE stops the onDurationTinner and starts the drx-InactivityTinner. At DL time 52, the UE detects a downlink grant for HARQ Process 2 (H2) on NPDCCH indicating new transmission. In response, the UE stops the drx-InactivityTinner since downlink grants for both HARQ processes have been received.

At DL time 53, the UE receives an NPDSCH for H1 and starts a corresponding HARQ RTT Timer (H1). At DL time 54, the UE receives an NPDSCH for H2 and starts a corresponding HARQ RTT Timer (H2). At DL time 55, the HARQ RTT Timer H1 expires. In response, the UE starts (or restarts) drx-InactivityTinner and drx-RetransmissionTimer (H1) (e.g., in case NPDSCH data decoding fails). At DL time 56, the HARQ RTT Timer H2 expires. In response, the UE starts (or restarts) drx-InactivityTinner and drx-RetransmissionTimer (H2) (e.g., in case NPDSCH data decoding fails).

At DL time 57, the UE detects a downlink grant for H1 on NPDCCH, and stops the drx-RetransmissionTimer (H1) if it is running. At DL time 58, the UE detects a downlink grant for H2 on NPDCCH, and stops the drx-InactivityTinner since a downlink grant for each of the HARQ processes has been received. The UE also stops drx-RetransmissionTimer (H2) if it is running.

With respect to uplink data transmission in connected mode DRX with 2 HARQ processes, using separated Das and HARQ feedbacks, the UE is configured to detect, at UL time 61, an uplink grant for HARQ process 1 (H1) on NPDCCH indicating a new transmission. In response, the UE stops the onDurationTimer and starts the drx-InactivityTinner. At UL time 62, the UE detects uplink grant for HARQ process 2 (H2) on NPDCCH indicating a new transmission. In response, the UE stops the drx-InactivityTinner since uplink grants for both HARQ processes have been received. At UL time 63, the UE transmits data on NPUSCH for H1, and starts corresponding UL HARQ RTT Timer (H1). At UL time 64, the UE transmits data on NPUSCH for H2, and starts corresponding UL HARQ RTT Timer (H2).

At UL time 65, the UL HARQ RTT Timer (H1) expires. In response, the UE starts (or restarts) drx-InactivityTinner and drx-ULRetransmissionTimer (H1). At UL time 66, the UL HARQ RTT Timer (H2) expires. In response, the UE starts or restarts drx-InactivityTinner and drx-ULRetransmissionTimer (H2). At UL time 67, the UE detects an uplink grant on NPDCCH for H1, and in response, stops drx-ULRetransnnissionTinner (H1). At UL time 68, the UE detects an uplink grant on NPDCCH for H2, and in response, stops drx-InactivityTinner since uplink grants for both HARQ processes have been received. The UE also stops drx-ULRetransmissionTimer (H2).

The network node 105 and/or the UE may, in some embodiments, be configured to switch between operation modes to apply one or more of the techniques described above. For example, the UE may switch operation modes in accordance with a configuration message sent from the network node 105. In particular, the UE may (in some embodiments) switch between a single HARQ operation mode and a multiple HARQ operation mode. In some embodiments, in the multiple HARQ operation mode, the UE may expect resource grants from exactly two HARQ processes on each of the uplink and the downlink. In some embodiments, in the multiple HARQ operation mode, the UE may be configured to determine whether receiving more than one resource grant is possible based on one or more criteria. In other words, receiving resource grants for multiple HARQ processes may be conditional or unconditional, depending on the embodiment. For example, in the multiple HARQ operation mode, receiving resource grants for multiple HARQ processes may be dependent on whether a HARQ process is busy, and/or has a pending transmission scheduled.

Figure 8:
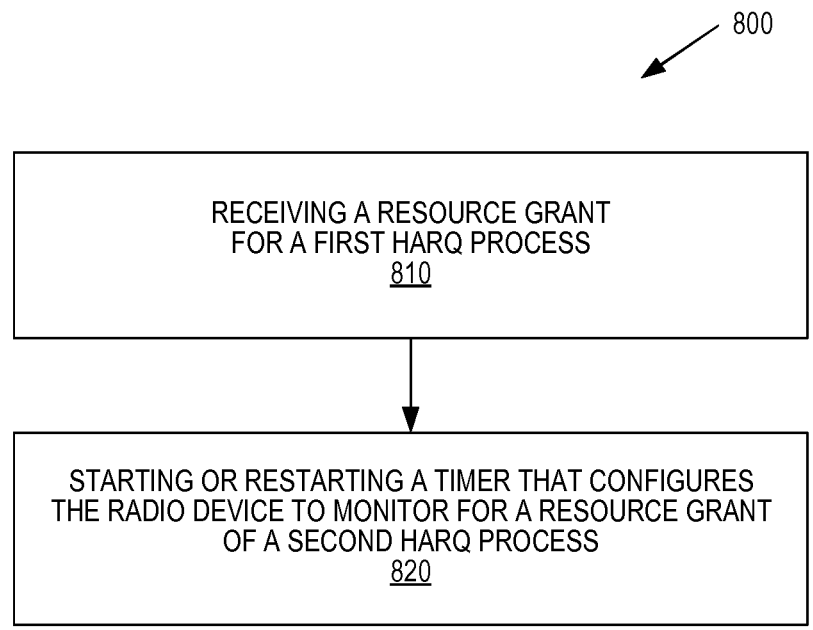
FIG. 8 is a flow diagram illustrating an example method performed by a radio device, according to one or more embodiments.

Consistent with one or more embodiments described above, FIG. 8 illustrates an example method 800 performed by a radio device 110 for supporting multiple HARQ processes. The method comprises receiving a resource grant for a first HARQ process (block 810), and in response, starting or restarting a timer that configures the radio device 110 to monitor for a resource grant of a second HARQ process (step 820).

Note that a radio device 110 as described above may perform any of the methods described herein (and any other processing herein) by implementing any functional means, units, or modules. In one embodiment, for example, the radio device 110 comprises respective circuits or circuitry configured to perform the steps of method shown in FIG. 8. The circuits or circuitry in this regard may comprise circuits dedicated to performing certain functional processing and/or may comprise one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more processors, carries out the techniques described herein.

Figure 9:
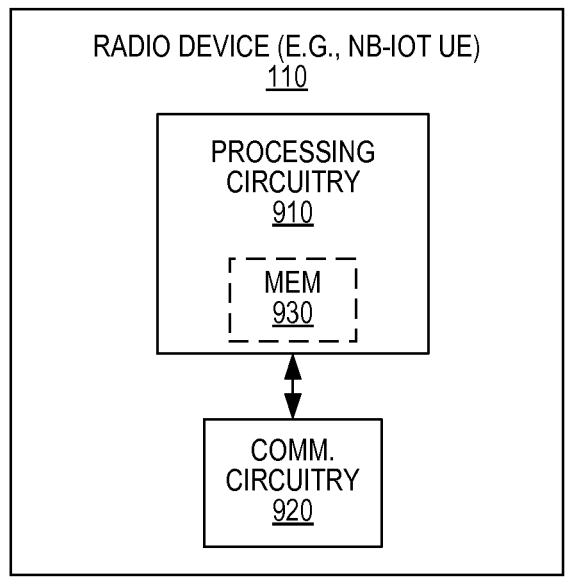
FIG. 9 is a block diagram illustrating an example radio device, according to one or more embodiments.

FIG. 9 illustrates an example radio device 110 implemented in accordance with one or more embodiments. As shown, the radio device 110 includes processing circuitry 910 and communication circuitry 920. The communication circuitry 920 is configured exchange signals with a network node 105, e.g., via any communication technology. Such communication may occur via one or more antennas (not shown) that are either internal or external to the radio device 110. The processing circuitry 910 is configured to perform processing described above, e.g., in FIG. 8, such as by executing instructions stored in memory 930. The processing circuitry 910 in this regard may implement certain functional means, units, or modules.

Figure 10:
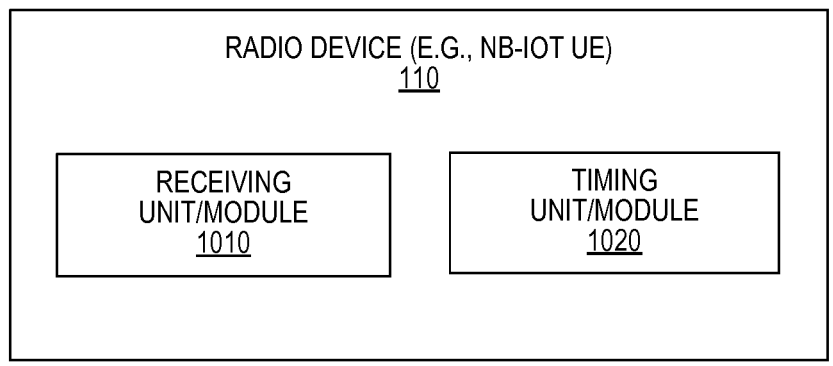
FIG. 10 is a block diagram illustrating another example radio device, according to one or more embodiments.

FIG. 10 illustrates an example radio device 110 implemented in accordance with one or more other embodiments. As shown, the radio device 110 of FIG. 10 implements various functional means, units, or modules, e.g., via the processing circuitry 910 in FIG. 9 and/or via software code. These functional means, units, or modules, e.g., for implementing the method in FIG. 8, include for instance a receiving unit or module 1010 for receiving a resource grant for a first HARQ process. Also included is a timing unit or module 1020 for starting or restarting a timer responsive to the receiving module receiving the resource grant for the first HARQ process, the timer configuring the radio device 110 to monitor for a resource grant of a second HARQ process.

Figure 11:
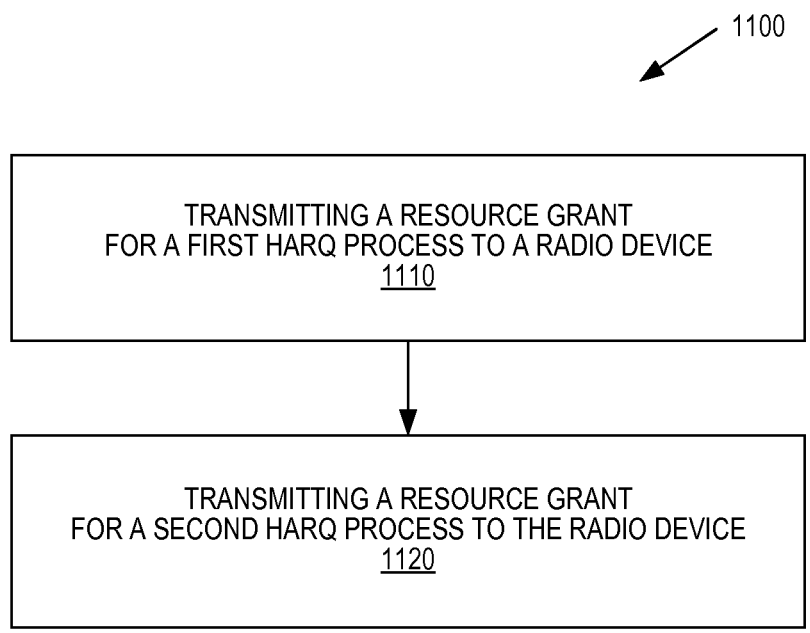
FIG. 11 is a flow diagram illustrating an example method performed by a network node, according to one or more embodiments.

Consistent with other embodiments described above, FIG. 11 illustrates an example method 1100 performed by a network node 105 for supporting multiple HARQ processes. The method 1100 comprises transmitting a resource grant for a first HARQ process to a radio device 110 (block 1110) and transmitting a resource grant for a second HARQ process to the radio device 110 (block 1120). In other words, the method comprises transmitting a resource grant for a first HARQ process and a resource grant for a second HARQ process to the same radio device 110.

Note that a network node 105 as described above may perform any of the methods described herein (and any other processing herein) by implementing any functional means, units, or modules. In one embodiment, for example, the network node 105 comprises respective circuits or circuitry configured to perform the steps of method shown in FIG. 11. The circuits or circuitry in this regard may comprise circuits dedicated to performing certain functional processing and/or may comprise one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more processors, carries out the techniques described herein.

Figure 12:
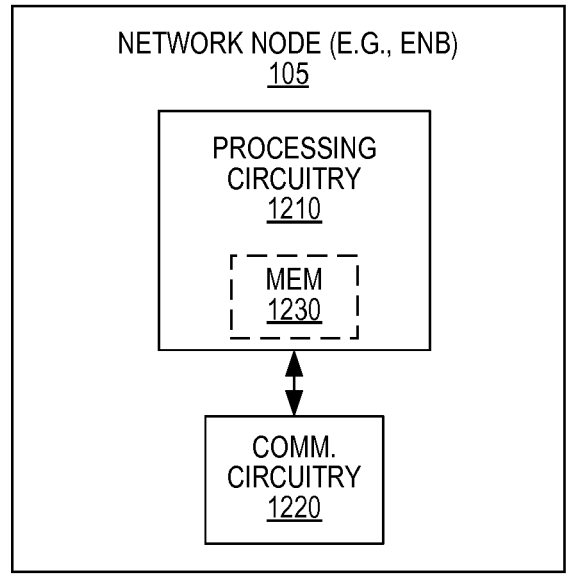
FIG. 12 is a block diagram illustrating an example network node, according to one or more embodiments.

FIG. 12 illustrates an example network node 105 implemented in accordance with one or more embodiments. As shown, the network node 105 includes processing circuitry 1210 and communication circuitry 1220. The communication circuitry 1220 is configured exchange signals with a radio node, e.g., via any communication technology. Such communication may occur via one or more antennas that are either internal or external to the network node 105. The processing circuitry 1210 is configured to perform processing described above, e.g., in FIG. 11, such as by executing instructions stored in memory 1230. The processing circuitry 1210 in this regard may implement certain functional means, units, or modules.

Figure 13:
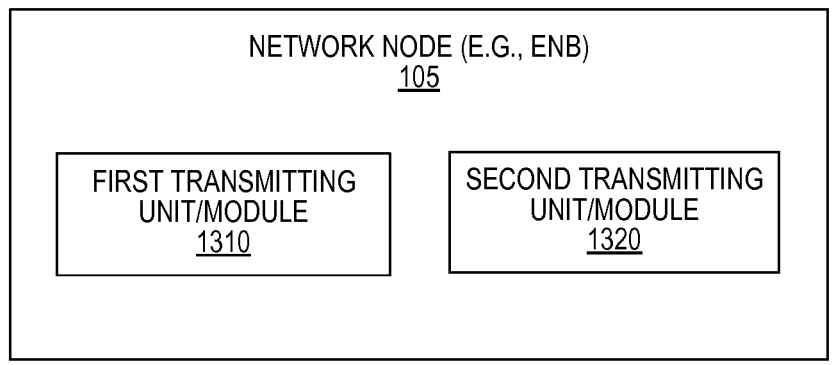
FIG. 13 is a block diagram illustrating another example network node, according to one or more embodiments.

FIG. 13 illustrates an example network node 105 implemented in accordance with one or more other embodiments. As shown, the network node 105 of FIG. 13 implements various functional means, units, or modules, e.g., via the processing circuitry in FIG. 12 and/or via software code. These functional means, units, or modules, e.g., for implementing the method in FIG. 11, include for instance a first transmitting unit or module 1310 for transmitting a resource grant for a first HARQ process to a radio device 110. Also included is a second transmitting unit or module 1320 for transmitting a resource grant for a second HARQ process to the radio device 110.

Embodiments herein further include methods and devices that initiate any of the methods described above, e.g., via one or more corresponding control commands issued over an appropriate signaling medium. Embodiments herein further include computer programs corresponding to any of the above. For example, one or more embodiments include a computer program that comprises instructions which, when executed on at least one processor of a user equipment, causes the user equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Embodiments herein further include a computer program product stored on a non-transitory computer readable (storage or recording) medium and comprising instructions that, when executed by a processor of a user equipment, cause the user equipment to perform as described above.

Embodiments further include a computer program product comprising program code portions for performing the steps of any of the embodiments herein when the computer program product is executed by a user equipment. This computer program product may be stored on a computer readable recording medium.

Embodiments of the present disclosure may be carried out in other ways than those specifically set forth herein without departing from the essential characteristics thereof. For example, additional physical units or software modules may be included in the various embodiments to perform any of the additional functions discussed above. Particular embodiments may enable an NB-IoT system to support two HARQ processes for data transfer on both downlink and uplink to increase data throughput and reduce data transfer latency, with marginal impact on device complexity and power consumption, for example. The embodiments disclosed herein are to be considered in all respects as illustrative and not restrictive, and all changes coming within the meaning and equivalency range of the appended embodiments are intended to be embraced therein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a radio device for supporting multiple Hybrid Automatic Repeat Request (HARQ) processes, the method comprising:
responsive to receiving a resource grant for a first HARQ process and determining that receiving a resource grant of a second HARQ process is possible according to one or more criteria, starting or restarting a timer that configures the radio device to monitor for the resource grant of the second HARQ process,
the determining that receiving the resource grant of the second HARQ process is possible according to the one or more criteria comprises
determining that the resource grant of the first HARQ process was received in order with respect to the second HARQ process; and
wherein the first and second HARQ processes are both uplink HARQ processes or both being downlink HARQ processes.

2. The method of claim 1, further comprising receiving the resource grant for the second HARQ process while the timer is running, and stopping the timer in response to the receiving of the resource grant for the second HARQ process.

3. The method of claim 2, wherein receiving the resource grants for the first and second HARQ processes comprises receiving the resource grants for the first and second HARQ processes over a Narrowband Physical Downlink Control Channel.

4. The method of claim 2, wherein receiving the resource grants for the first and second HARQ processes comprises receiving the resource grants for the first and second HARQ processes within a resource grant search space monitored by the radio device.

5. The method of claim 1, wherein starting or restarting the timer that configures the radio device to monitor for the resource grant of the second HARQ process comprises switching the radio device from a single HARQ operation mode to a multiple HARQ operation mode.

6. The method of claim 1, wherein the determining that the resource grant of the first HARQ process was received in order with respect to the second HARQ process is based on a HARQ process identifier of the first HARQ process.

7. The method of claim 1, further comprising refraining from monitoring a control channel on which the resource grants for the first and second HARQ processes are transmitted responsive to the timer not running.

8. The method of claim 1, wherein the resource grant for the first HARQ process and a corresponding data transmission scheduled according to the resource grant for the first HARQ process are carried by a 1 ms control subframe and a 1 ms data subframe, respectively.

9. A radio device for supporting multiple Hybrid Automatic Repeat Request (HARQ) processes, the radio device comprising:
processing circuitry and communication circuitry communicatively coupled to the processing circuitry, wherein the processing circuitry is configured to:
responsive to receiving a resource grant for a first HARQ process via the communication circuitry and determining that receiving a resource grant of a second HARQ process is possible according to one or more criteria, start or restart a timer that configures the radio device to monitor for the resource grant of the second HARQ process,
the determining that receiving the resource grant of the second HARQ process is possible according to the one or more criteria comprising
determining that the resource grant of the first HARQ process was received in order with respect to the second HARQ process; and
wherein the first and second HARQ processes both being uplink HARQ processes or both being downlink HARQ processes.

10. The radio device of claim 9, wherein the processing circuitry is further configured to receive the resource grant for the second HARQ process via the communication circuitry while the timer is running, and stop the timer in response to the receiving of the resource grant for the second HARQ process.

11. The radio device of claim 10, wherein to receive the resource grants for the first and second HARQ processes via the communication circuitry, the processing circuitry is configured to receive the resource grants for the first and second HARQ processes via the communication circuitry over a Narrowband Physical Downlink Control Channel.

12. The radio device of claim 10, wherein to receive the resource grants for the first and second HARQ processes via the communication circuitry, the processing circuitry is configured to receive the resource grants for the first and second HARQ processes via the communication circuitry within a resource grant search space monitored by the radio device.

13. The radio device of claim 9, wherein to start or restart the timer that configures the radio device to monitor for the resource grant of the second HARQ process, the processing circuitry is configured to switch the radio device from a single HARQ operation mode to a multiple HARQ operation mode.

14. The radio device of claim 9, wherein to determine that the resource grant of the first HARQ process was received in order with respect to the second HARQ process, the processing circuitry is configured to determine that the resource grant of the first HARQ process was received in order with respect to the second HARQ process based on a HARQ process identifier of the first HARQ process.

15. The radio device of claim 9, wherein the processing circuitry is further configured to refrain from monitoring a control channel on which the resource grants for the first and second HARQ processes are transmitted responsive to the timer not running.

16. A non-transitory computer readable medium storing a computer program product for controlling a programmable radio device, the computer program product comprising software instructions that, when run on the programmable radio device, cause the programmable radio device to:
responsive to receiving a resource grant for a first HARQ process and determining that receiving a resource grant of a second HARQ process is possible according to one or more criteria, start or restart a timer that configures the radio device to monitor for the resource grant of the second HARQ process,
the determining that receiving the resource grant of the second HARQ process is possible according to the one or more criteria comprising
determining that the resource grant of the first HARQ process was received in order with respect to the second HARQ process; and
wherein the first and second HARQ processes both being uplink HARQ processes or both being downlink HARQ processes.

* * * * *